(No Model.)
J. McCAIN.
SPRING FORK FOR BICYCLES.
No. 468,750. Patented Feb. 9, 1892.
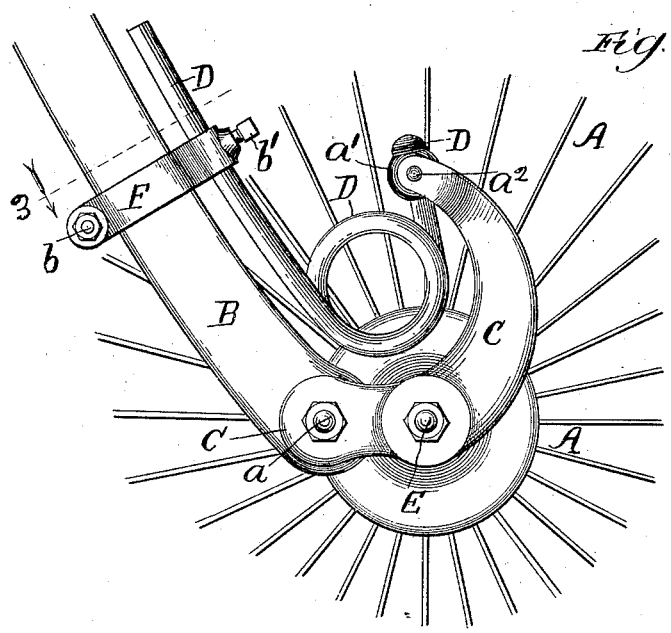
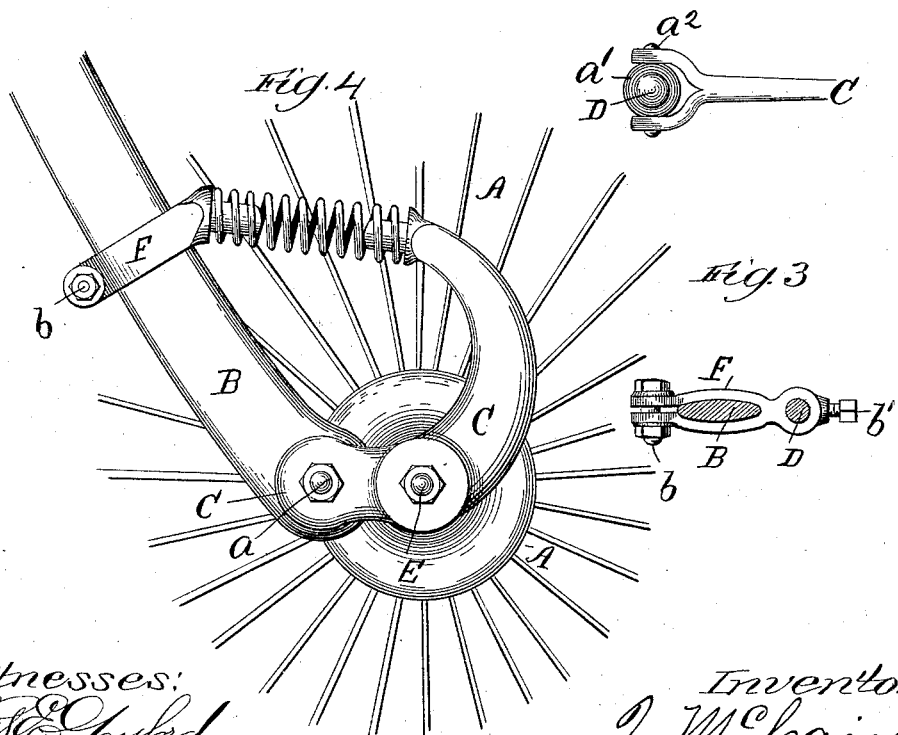
Witnesses:
Chas. E. Gaylord
L. M. Freeman
Inventor:
J. McCain
By L. B. Coupland & Co.
Attys

UNITED STATES PATENT OFFICE.

JOSEPH McCAIN, OF CHICAGO, ILLINOIS, ASSIGNOR TO WILLIAM J. EDWARDS, OF SAME PLACE.

SPRING-FORK FOR BICYCLES.

SPECIFICATION forming part of Letters Patent No. 468,750, dated February 9, 1892.

Application filed June 19, 1891. Serial No. 396,866. (No model.)

*To all whom it may concern:*

Be it known that I, JOSEPH McCAIN, a citizen of the United States, residing at Chicago, in the county of Cook and State of Illinois, have invented certain new and useful Improvements in Spring Attachments for Bicycles, of which the following is a full, clear, and exact description, that will enable others to make and use the same, reference being had to the accompanying drawings, forming a part of this specification, in which—

Figure 1 is a broken-away side elevation embodying my improved features. Fig. 2 is a plan of a broken-away detail; Fig. 3 a transverse section in plane 3, Fig. 3; and Fig. 4, a modification.

This invention has for its object to provide the rigid frame of bicycles and the like with a spring attachment to obviate the usual unpleasant jar or shaking motion incident to the device under the ordinary arrangements.

Referring to the drawings, A represents the wheel part and B the usual fork parts.

The improvement consists, principally, in the curved arm C and the spring D. The curved arm C is rigidly mounted on the axle E and the adjacent end of the fork B, secured to the lower end thereof by the pivot-bolt $a$. A globular bearing $a'$ is pivotally secured between the upper bifurcated end of the arm C, by means of the pin $a^2$, as shown in Figs. 1 and 2. One end of the spring D is rigidly secured in the bearing $a'$, the opposite end extending upwardly from the coiled parts somewise alongside of the fork, as shown. The fork part of this spring is retained in place by means of the adjustable clamp F, Fig. 3, which embraces the fork, the open ends being drawn together by the bolt $b$. The opposite end of the clamp is perforated for the insertion of the corresponding end of the spring D, the set-screw $b'$ serving to secure these parts together. By this means the tension of the spring may be varied in accordance with the weight of the rider or other circumstances. It will be observed that the coil part of the spring is placed well down between the arm attachment and the fork; but it is obvious that it might be placed in an inverted position, or another form of spring used and arranged and connected in the manner illustrated in Fig. 4. It will also be noted that the fork is not mounted on the axle, as is usually the case, but is pivotally connected to one end of the curved spring-arm. But one curved arm and one spring are shown, but it will be understood that the parts are in duplicate and located on each side of the wheel, the arms being secured to the respective lower ends of the fork. This attachment and arrangement converts the usual rigid frame into an elastic one and affords great ease and comfort to the rider by relieving the arms of the usual trembling jerky motion, and in yielding to obstructions and unevenness in the roadway.

Having thus described my invention, what I claim as new, and desire to secure by Letters Patent, is—

1. In a bicycle attachment, the combination of a curved arm or arms rigidly mounted on the wheel-axle, the fork pivotally secured to the adjacent end of said arms, and a spring interposed between said arms and fork and having one end fixed in a yielding bearing pivoted in the upper end of said curved arm or arms and the opposite end adjustably secured to said fork, substantially as set forth.

2. In a bicycle attachment, the combination of the axle, the curved arm or arms rigidly mounted thereon, the fork pivotally secured to the respective lower ends of said arms, the spring or springs inserted between and connecting the upper ends of said arms with the adjacent fork part, and the clip adjustably securing one end of said spring or springs to said fork, substantially as set forth.

JOSEPH McCAIN.

Witnesses:
L. M. FREEMAN,
J. B. DONALSON.